US010489886B2

United States Patent
Yu et al.

(10) Patent No.: US 10,489,886 B2
(45) Date of Patent: Nov. 26, 2019

(54) STITCHING METHOD AND APPARATUS FOR PANORAMIC STEREO VIDEO SYSTEM

(71) Applicant: SHANGHAITECH UNIVERSITY, Shanghai (CN)

(72) Inventors: Jingyi Yu, Shanghai (CN); Yi Ma, Shanghai (CN)

(73) Assignee: ShanghaiTech University, Shanghai (CN)

( * ) Notice: Subject to any disclaimer, the term of this patent is extended or adjusted under 35 U.S.C. 154(b) by 0 days.

(21) Appl. No.: 16/069,183

(22) PCT Filed: Jan. 13, 2016

(86) PCT No.: PCT/CN2016/070823
§ 371 (c)(1),
(2) Date: Jul. 11, 2018

(87) PCT Pub. No.: WO2017/120802
PCT Pub. Date: Jul. 20, 2017

(65) Prior Publication Data
US 2019/0035055 A1    Jan. 31, 2019

(30) Foreign Application Priority Data
Jan. 12, 2016  (WO) ................ PCT/CN2016/070712

(51) Int. Cl.
*H04N 13/246*    (2018.01)
*G06T 7/80*    (2017.01)
(Continued)

(52) U.S. Cl.
CPC .......... *G06T 3/4038* (2013.01); *G06K 9/6202* (2013.01); *G06T 3/0093* (2013.01);
(Continued)

(58) Field of Classification Search
CPC . G06T 7/85; G06T 7/337; G06T 2207/10021; H04N 13/10; H04N 13/243
See application file for complete search history.

(56) References Cited

U.S. PATENT DOCUMENTS 9,338,439 B2    5/2016 Grossmann et al.
9,973,694 B1 *  5/2018 van Hoff ............ H04N 5/23238
(Continued)

FOREIGN PATENT DOCUMENTS

CN    102055982 A    5/2011
CN    102243432 A    11/2011
(Continued)

OTHER PUBLICATIONS

Zhang, Fan and Liu, Feng, "Casual Stereoscopic Panorama Stitching", Computer Vision and Pattern Recognition (CVPR), Jun. 7-12, 2015 IEEE Conference on Computer Vision and Pattern Recognition (CVPR) (Year: 2015).*

(Continued)

*Primary Examiner* — Jamie J Atala
*Assistant Examiner* — Michael Robert Cammarata
(74) *Attorney, Agent, or Firm* — Sheppard Mullin Richter & Hampton LLP

(57) ABSTRACT

A method of generating a stereoscopic panorama is provided, the method comprising: processing a first right image, a second right image, a first left image, and a second left image to derive a right homography between the first right image and the second right image and a left homography between the first left image and the second left image; stitching the first right image with the second right image to generate a right panorama, the first left image with the second left image to generate a left panorama wherein the (Continued)

right homography is consistent with the left homography; and generating a stereo panorama using the right panorama and the left panorama.

18 Claims, 6 Drawing Sheets

(51) Int. Cl.

| | | |
|---|---|---|
| *G06T 7/33* | (2017.01) | |
| *H04N 13/00* | (2018.01) | |
| *G06T 3/40* | (2006.01) | |
| *H04N 13/243* | (2018.01) | |
| *H04N 13/239* | (2018.01) | |
| *G06T 7/73* | (2017.01) | |
| *H04N 13/282* | (2018.01) | |
| *H04N 19/126* | (2014.01) | |
| *H04N 19/159* | (2014.01) | |
| *H04N 19/176* | (2014.01) | |
| *H04N 19/523* | (2014.01) | |
| *H04N 13/106* | (2018.01) | |
| *H04N 13/128* | (2018.01) | |
| *G06K 9/62* | (2006.01) | |
| *G06T 3/00* | (2006.01) | |
| *H04N 5/232* | (2006.01) | |

(52) U.S. Cl.
CPC ............... *G06T 3/40* (2013.01); *G06T 7/337* (2017.01); *G06T 7/74* (2017.01); *G06T 7/85* (2017.01); *H04N 5/23238* (2013.01); *H04N 13/106* (2018.05); *H04N 13/128* (2018.05); *H04N 13/239* (2018.05); *H04N 13/243* (2018.05); *H04N 13/246* (2018.05); *H04N 13/282* (2018.05); *H04N 19/126* (2014.11); *H04N 19/159* (2014.11); *H04N 19/176* (2014.11); *H04N 19/523* (2014.11); *G06T 2207/10021* (2013.01); *H04N 2013/0081* (2013.01)

(56) References Cited

U.S. PATENT DOCUMENTS

| | | | |
|---|---|---|---|
| 2002/0145660 | A1 | 10/2002 | Kanade et al. |
| 2004/0001138 | A1 | 1/2004 | Weerashinghe et al. |
| 2007/0052794 | A1 | 3/2007 | Ha et al. |
| 2008/0002023 | A1 | 1/2008 | Cutler |
| 2011/0069148 | A1 | 3/2011 | Jones et al. |
| 2012/0154518 | A1 | 6/2012 | Zargarpour et al. |
| 2012/0236934 | A1 | 9/2012 | Chen et al. |
| 2012/0249730 | A1 | 10/2012 | Lee |
| 2013/0044186 | A1 | 2/2013 | Jin et al. |
| 2013/0063549 | A1 | 3/2013 | Schnyder et al. |
| 2013/0176390 | A1 | 7/2013 | Chen et al. |
| 2013/0265387 | A1* | 10/2013 | Jin .................... H04N 5/232 348/42 |
| 2014/0098185 | A1 | 4/2014 | Davari et al. |
| 2014/0125771 | A1 | 5/2014 | Grossmann et al. |
| 2014/0218550 | A1 | 8/2014 | Chuang et al. |
| 2014/0300691 | A1 | 10/2014 | Saito et al. |
| 2014/0307045 | A1 | 10/2014 | Richardt et al. |
| 2014/0355685 | A1 | 12/2014 | Chen et al. |
| 2015/0199839 | A1* | 7/2015 | Chon .................... G06K 9/4633 345/427 |
| 2015/0341617 | A1* | 11/2015 | Cole .................... G03B 17/561 348/36 |
| 2015/0348580 | A1 | 12/2015 | van Hoff et al. |
| 2016/0088287 | A1* | 3/2016 | Sadi .................... H04N 13/254 348/43 |
| 2016/0353090 | A1* | 12/2016 | Esteban ............. G02B 27/0172 |
| 2018/0063513 | A1* | 3/2018 | Bar .......................... G06T 7/10 |
| 2018/0278976 | A1* | 9/2018 | Mao ................ H04N 21/21805 |

FOREIGN PATENT DOCUMENTS

| | | |
|---|---|---|
| CN | 103108187 A | 5/2013 |
| CN | 103179405 A | 6/2013 |
| CN | 104169965 A | 11/2014 |
| CN | 105049850 A | 11/2015 |
| EP | 1679659 A1 | 7/2006 |
| EP | 2793187 A1 | 10/2014 |
| WO | 2010085361 A2 | 7/2010 |
| WO | 2012/136388 A1 | 10/2012 |
| WO | 2013/151883 A1 | 10/2013 |
| WO | 2015/085406 A1 | 6/2015 |
| WO | 2016/048017 A1 | 3/2016 |
| WO | 2018/064110 A1 | 4/2018 |

OTHER PUBLICATIONS

PCT International Search Report and the Written Opinion dated Sep. 22, 2016, issued in related International Application No. PCT/CN2016/070823 (6 pages).
PCT International Preliminary Report on Patentability dated Jul. 26, 2018, issued in related International Application No. PCT/CN2016/070823 (5 pages).
PCT International Search Report and the Written Opinion dated Oct. 17, 2016, issued in related International Application No. PCT/CN2016/071238 (7 pages).
PCT International Preliminary Report on Patentability dated Jul. 26, 2018, issued in related International Application No. PCT/CN2016/071238 (5 pages).
PCT International Search Report and the Written Opinion dated Oct. 19, 2016, issued in related International Application No. PCT/CN2016/070712 (6 pages).
PCT International Preliminary Report on Patentability dated Jul. 26, 2018, issued in related International Application No. PCT/CN2016/070712 (5 pages).
Kun Feng et al., "A Bit Allocation Method for Multi-view Video Coding Based on Stereoscopic Visual Saliency", *Journal of Optoelectronics • Laser*, vol. 24, No. 10, Oct. 31, 2013, pp. 1995-2001.
Haksub Kim et al., "Saliency Prediction on Stereoscopic Videos", IEEE Transactions on Image Processing, vol. 23, No. 4, Apr. 30, 2014, pp. 1476-1490.
Extended European Search Report dated May 10, 2019, issued in European Application No. 16884543.6 (12 pages).
Heiko Schwarz et al., "Description of 3D Video Coding Technology Proposal by Fraunhofer HHI (HEVC compatible, configuration B", MPEG Meeting, International Organisation for Standardisation, ISO/IE JT1/SC29/WG11, Coding of Moving Pictures and Audio, Nov. 22, 2011 (46 pages).
Minghui Wang et al., "Region-of-interest based dynamical parameter allocation for H.264/AVC encoder", Picture Coding Symposium, May 6, 2009 (4 pages).
Extended European Search Report dated Sep. 11, 2019, issued in related European Application No. 16884365.4 (9 pages).

* cited by examiner

STITCHING METHOD AND APPARATUS FOR PANORAMIC STEREO VIDEO SYSTEM

CROSS-REFERENCE TO RELATED APPLICATIONS

This application is a National Phase application under 35 U.S.C. § 371 of PCT Application No. PCT/CN2016/070823, filed Jan. 13, 2016, which application claims priority benefit to PCT Application No. PCT/CN2016/070712, filed Jan. 12, 2016. The entire contents of all of the above-referenced applications are hereby incorporated herein by reference.

TECHNICAL FIELD

The present invention relates to panoramic stereo video systems for capturing, processing, compressing, and displaying 3D panoramic stereo videos, and more particularly, to methods and apparatus for stitching images to generate 3D panoramic stereo videos in the panoramic stereo video systems.

BACKGROUND

In panoramic stereo video systems, a multi-camera array with certain geometric configuration is often used to capture images. For example, the camera array may have 8 pairs of cameras installed on a mounting frame in the shape of a regular octagon, with each pair of cameras placed on each side of the octagon and having parallel optical axes. Such camera array can capture eight pairs of video data, with each pair capturing two videos to generate a stereo video. Two panoramic videos can be generated by stitching the videos captured by all the left cameras and all the right cameras in the eight pairs respectively. The two panoramic videos can then be sent to a display system to display a panoramic stereo video.

As compared with traditional single panorama stitching, stereo stitching faces more constraints. In particular, since the camera array often has a particular geometric configuration, the video data captured by the various cameras in the camera array will often have certain relationship among themselves that must be taken into consideration. Therefore, there is a need for a new method of stitching images to generate a stereo panoramic video that optimizes performance while satisfying certain constraints.

SUMMARY OF THE INVENTION

To address issues in the prior art, embodiments of the present invention provide a method and apparatus for stitching images to generate a stereo panoramic video that optimizes performance while satisfying certain constraints.

In accordance with an embodiment of the present invention, an image acquisition and processing apparatus for capturing images to generate a stereoscopic panorama is provided, the image acquisition and processing apparatus comprising: a camera array comprising a first right camera, a second right camera, a first left camera, and a second left camera, wherein a relative position between the first right camera and the second right camera is substantially the same as a relative position between the first left camera and the second left camera; and an image processing unit configured to stitch a first right image captured by the first right camera with a second right image captured by the second right camera to generate a right panorama, and to stitch a first left image captured by the first left camera with a second left image captured by the second left camera to generate a left panorama, wherein the image processing unit is configured to derive a right homography between the first right image and the second right image consistent with left a homography between the first left image and the second left image.

Preferably, the image processing unit is configured to identify and match a feature in the first right image and the second right image.

Preferably, the image processing unit is configured to estimate the right homography using a random sample consensus (RANSAC) algorithm.

Preferably, the first right camera and the second right camera comprise parallel optical axes.

Preferably, the first right camera, the second right camera, the first left camera, and the second left camera are situated substantially on a plane.

Preferably, the first right camera and the second right camera are situated on a first side of a regular polygon, and the first left camera and the second left camera are situated on a second side of the regular polygon adjacent to the first side.

In accordance with another embodiment of the present invention, a method of generating a stereoscopic panorama is provided, the method comprising: processing a first right image, a second right image, a first left image, and a second left imaging to derive a right homography between the first right image and the second right image and a homography between the first left image and the second left image; stitching the first right image with the second right image to generate a right panorama, the first left image with the second left image to generate a left panorama wherein the right homography is consistent with the left homography; and generating a stereo panorama using the right panorama and the left panorama.

Preferably, the method further comprises identifying and matching a feature in the first right image and the second right image.

Preferably, the method further comprises estimating the right homography using a random sample consensus (RANSAC) algorithm.

Preferably, the method further comprises capturing the first right image, the second right image, the first left image, and the second left imaging using a camera array comprising a first right camera, a second right camera, a first left camera, and a second left camera, wherein a relative position between the first right camera and the second right camera is substantially the same as a relative position between the first left camera and the second left camera, and the first right camera and the second right camera comprise parallel optical axes.

Preferably, the first right camera, the second right camera, the first left camera, and the second left camera are situated substantially on a plane.

Preferably, the first right camera and the second right camera are situated on a first side of a regular polygon, and the first left camera and the second left camera are situated on a second side of the regular polygon adjacent to the first side.

In accordance with embodiments of the present invention, images are captured using a camera array having certain geometric configuration, and images captured by the camera array are stitched to generate a stereo panoramic video using a method that optimizes performance while satisfying certain constraints.

BRIEF DESCRIPTION OF THE DRAWINGS

To better illustrate the technical features of the embodiments of the present invention, various embodiments of the present invention will be briefly described in conjunction with the accompanying drawings.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings. It is obvious that the draws are but for exemplary embodiments of the present invention, and that a person of ordinary skill in the art may derive additional draws without deviating from the principles of the present invention.

In accordance with embodiments of the present invention, a panoramic stereo video system including multi-camera video capturing, data processing, stereo video coding, transmission, and 3D displaying is provided. The panoramic stereo video system employs real-time multi-view videos capturing, image rectification and pre-processing, and region of interest (ROI) based stereo video compression. After the transmission and decoding process, a head-mounted display (HMD) headset is used to display the left and right views.

1. System Overview

Figure 1:
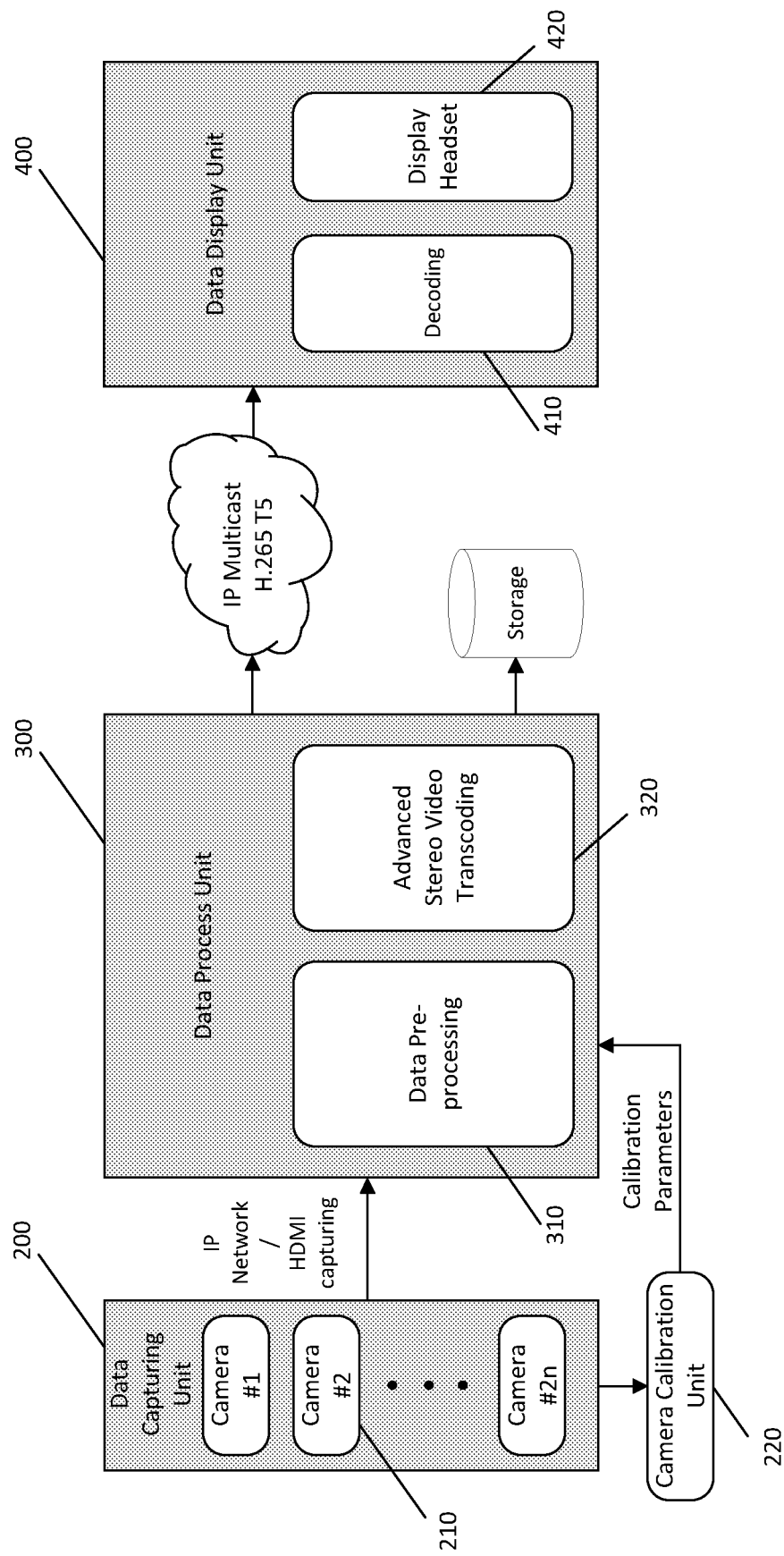
FIG. 1 is an exemplary schematic diagram for a panoramic stereo video system in accordance with an embodiment of the present invention.

FIG. 1 is an exemplary schematic diagram for a panoramic stereo video system in accordance with an embodiment of the present invention. The panoramic stereo video system 100 uses a camera array to capture 3D panoramic video, and displays the captured 3D panoramic video on either a 3D TV or a head-mounted virtual reality display device. As shown in FIG. 1, the panoramic stereo video system 100 includes a data capturing unit 200, a data processing unit 300, and a data display unit 400. The data capturing unit 200 includes a plurality of cameras in a camera array 210, and a camera calibration unit 220. The data processing unit 300 includes a data pre-processing unit 310 and an advanced stereo video transcoding unit 320. The data display unit 400 includes a decoding unit 410, and a display headset 420.

2. Data Capturing Unit

As shown in FIG. 1, the data capturing unit 200 includes a plurality of cameras in a camera array 210, and a camera calibration unit 220 for calibrating the camera array 210.

2.1. Camera Array

Figure 2:
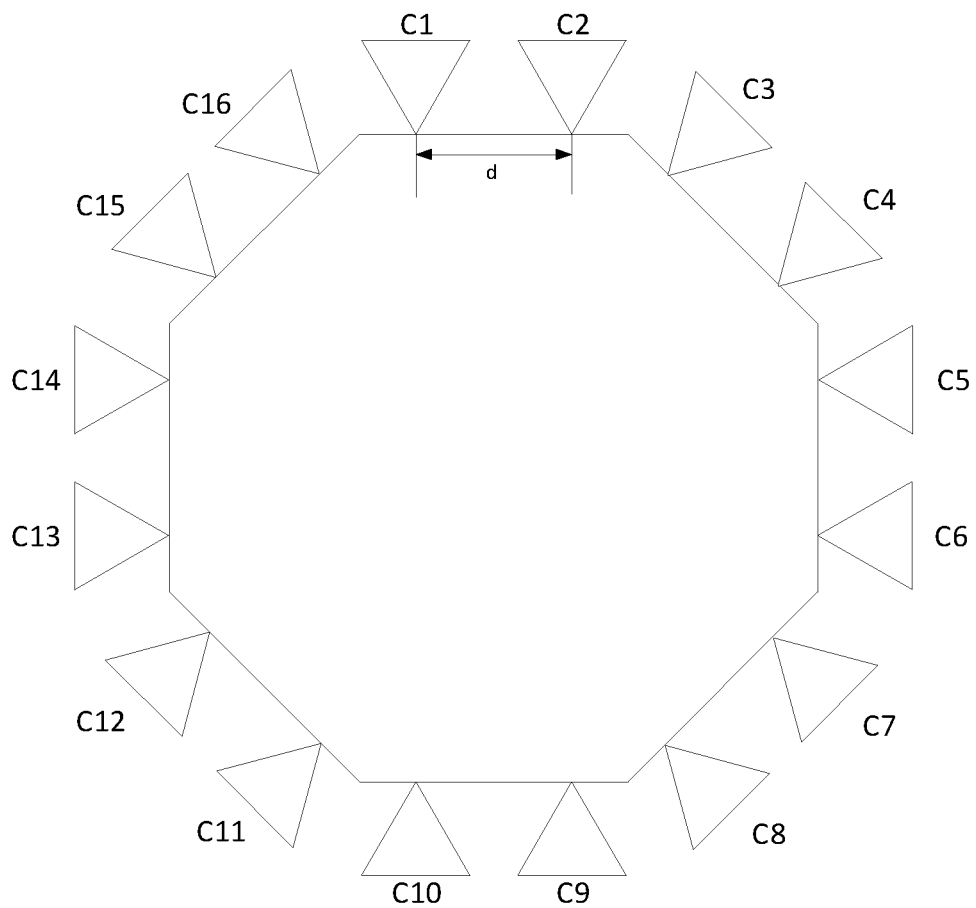
FIG. 2 is an exemplary schematic diagram for a camera array in the panoramic stereo video system in accordance with an embodiment of the present invention.

FIG. 2 is an exemplary schematic diagram for a camera array in the panoramic stereo video system in accordance with an embodiment of the present invention.

As shown in FIG. 2, the camera array 210 has 16 high-definition cameras c1-c16 installed on a mounting frame in the shape of a regular octagon, with a pair of cameras placed on each side of the octagon. The two cameras on each side, such as c1 and c2, have parallel optical axes, and are separated by a distance d. The raw video data captured by the camera array 210 is transmitted through cable to a computer for further processing. The parameters for the camera are listed in Table 1 below.

TABLE 1

| | |
|---|---|
| Sensor | OV2710 |
| Sensor Size | 1/2.7 inch |
| Pixel Size | 3 * 3 |
| Image Area | 5856 * 3276 |
| Resolution | FULL HD 1920(H) * 1080(V) |
| Frame | MJPEG@30fps |
| USB protocol | USB2.0 HS/FS |
| AEC | Support |
| AEB | Support |
| AGC | Support |
| Lens | Standard 2.1 mm, |
| Parameter | optional/2.5/2.8/3.6/6 mm/FOV(D)170 Degree/187 Degree |

It should be noted that while the camera array is depicted as a regular octagon in FIG. 2, the camera array can be configured in other shapes in accordance with other embodiments of the present invention. Specifically, in one embodiment of the present invention, the cameras are installed on a rigid frame, so that the relative positions among the plurality of cameras are substantially constant. In another embodiment of the present invention, the cameras are located substantially on the same plane, such as on the sides of a polygon.

2.2. Camera Calibration

To stitch images captured by the cameras together and generate 3D effects, it is necessary to obtain both the internal and parameters of the cameras. The extrinsic parameters include the rotation and translation among the cameras, so that the images captured by different cameras can be rectified and aligned in the horizontal direction. Also, there may be distortions in the images captured by the cameras, and to obtain images free of the distortions, it is necessary to know the camera distortion parameters. These parameters are obtained during the camera calibration process.

2.2.1. Calibration of Internal and Distortion Parameters

The internal and distortion parameters of the cameras can be obtained using a variety of methods, such as the calibration method proposed by Zhengyou Zhang, and tools like MatLab can be employed to obtain these parameters.

2.2.2. Calibration of Extrinsic Parameters

After obtaining the internal parameters of the cameras, a method based on structure from motion is employed to obtain the rotations and translations among the cameras. This method has the following advantages.

Efficiency: there is no need to calibrate the cameras pair by pair. Rather, all cameras capture videos of a scene simultaneously during calibration, and the extrinsic parameters for all the cameras can be obtained at the same time.

Accuracy: in pattern-based calibration methods, the pattern needs to be captured by two adjacent cameras, which often results in lower resolution for the pattern and reduces the accuracy of the calibration. In our structure from motion based method, the movement of each camera will be estimated independently to obtain the parameters, and there is no need for adjacent cameras to have an overlapping field of view. Thus, we can place the cameras closer to the scene to be captured to achieve better accuracy.

Extensibility: since our method does not require an overlapping field of view for adjacent cameras, it is even applicable to cameras placed in back-to-back positions.

2.3. Data Capturing Method

Data from the 16 cameras are captured and stored using software, and then provided to the data processing unit. Image data for each frame captured by the cameras can be collected using software such as FFmpeg and DirectShow (or DShow). The frames captured by each camera are compressed and then stored as video files. Since there are a number of cameras, the frames captured by the cameras need to be synchronized, such as using time stamps. For example, each frame captured by the cameras can be affixed with a time stamp, and placed in a queue so that it is synchronized with other frames with the same time stamp. The synchronized frames are coded into video streams, and stored locally or transmitted through the network together.

3. Data Processing Unit

As shown in FIG. 1, the data processing unit 300 includes data pre-processing unit 310 and an advanced stereo video transcoding unit 320.

Figure 3:
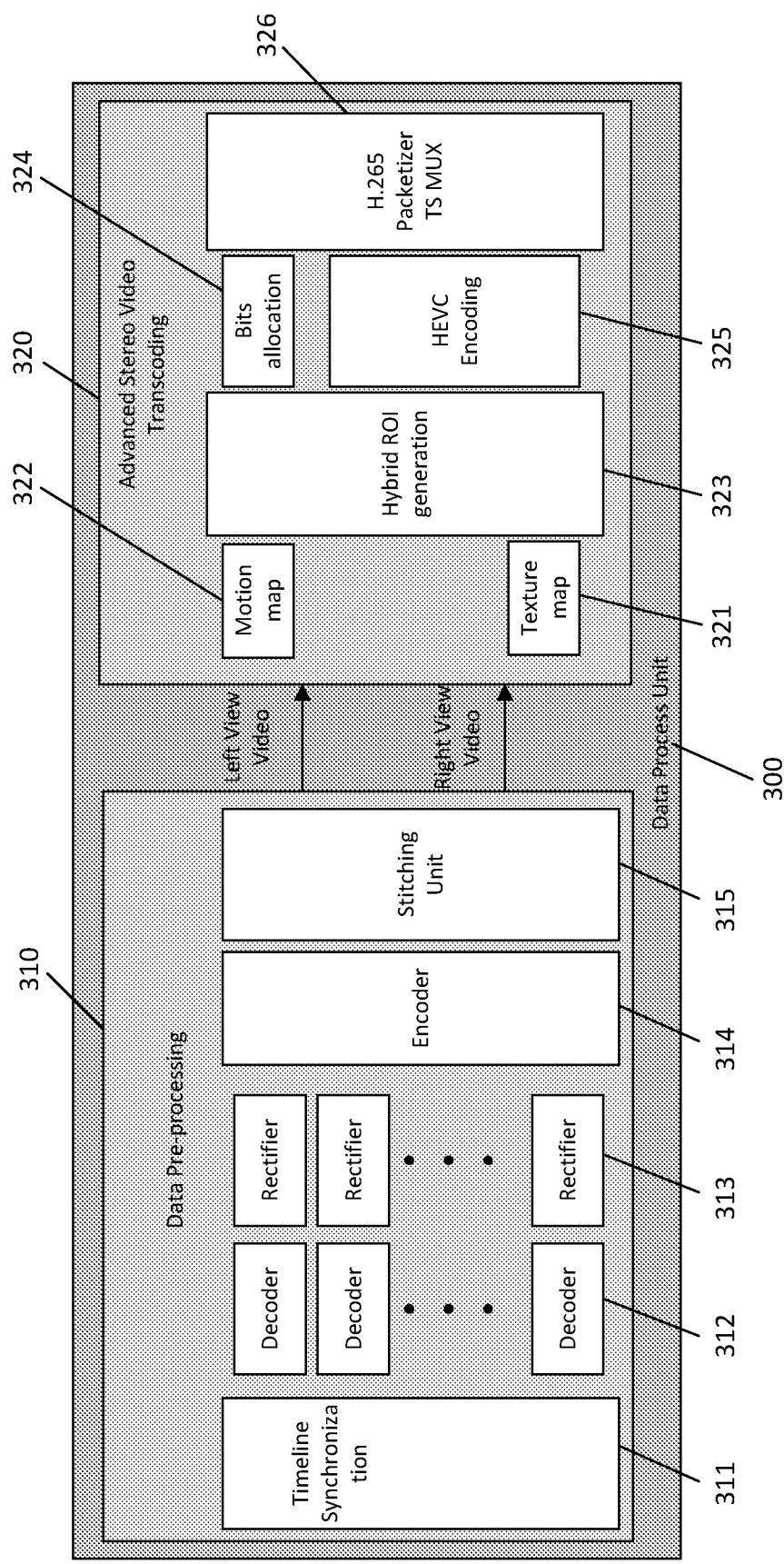
FIG. 3 is an exemplary schematic diagram for a data processing unit in a panoramic stereo video system in accordance with an embodiment of the present invention.

FIG. 3 is an exemplary schematic diagram for a data processing unit in a panoramic stereo video system in accordance with an embodiment of the present invention. As shown in FIG. 3, the data pre-processing unit 310 includes a timeline synchronization 311 for synchronizing the images captured by the cameras, a number of decoders 312 for decoding streams of raw video, a number of rectifiers 313 for rectifying the raw video, an encoder 314 for video processing, including noise reducing and editing, a stitching unit for stitching videos to generate panoramic video. The data pre-processing unit 310 outs a left view video and a right view video to the advanced stereo video transcoding unit 320. The advanced stereo video transcoding unit 320 generates a motion map 321 and a texture map 322 for the video, and a hybrid region of interest (ROI) generating unit 323 identifies regions of interests in the videos based on the motion map and 321 the texture map 322. A bits allocation unit 324 allocates bits based on the identified region of interests, and a HEVC encoding unit 325 encodes the videos. A H.265 packetizer 326 packs the encoded videos for transmission.

Figure 4:
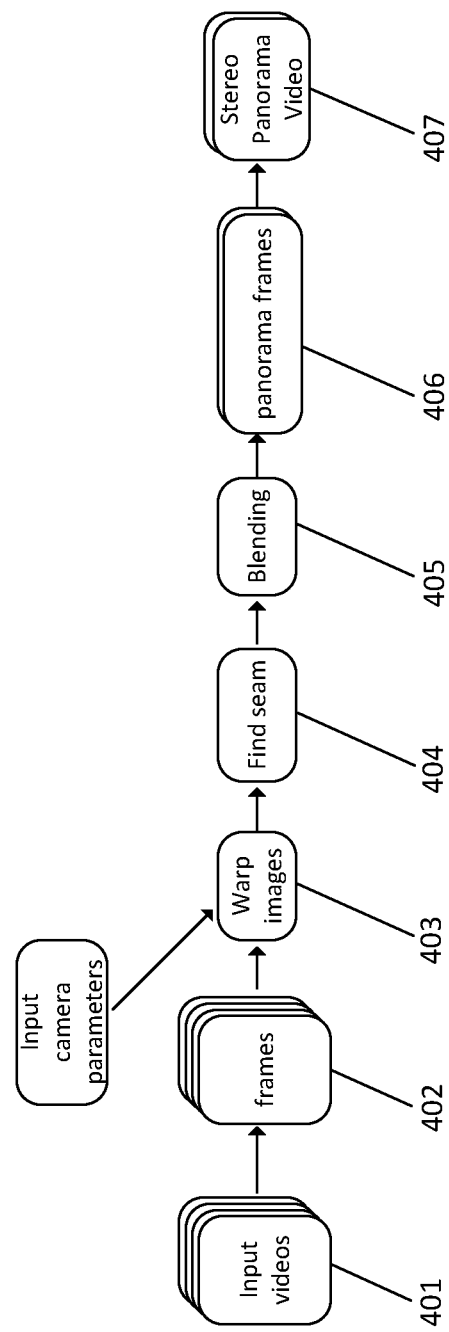
FIG. 4 is an exemplary flowchart for a method of stitching a panoramic stereo video in accordance with an embodiment of the present invention.

FIG. 4 is an exemplary flowchart for a method of stitching a panoramic stereo video in accordance with an embodiment of the present invention.

3.1 Distortion Correction and Preprocessing

The frames captured by the cameras are warped in accordance with the distortion parameters obtained during the calibration process to obtain frames free of distortions. In order to enhance the accuracy of image alignment and stitching, the frames are filtered first to reduce noises.

3.2. Image Alignment

Image alignment is performed on each pair of cameras located on each side of the octagon, and the images captured by each pairs of cameras are aligned in the horizontal direction. In accordance with an embodiment of the present invention, each frame captured by the pairs of cameras is warped to a plane that is parallel to the optical axes of the pair of cameras.

4. Panoramic Video Stitching

The camera array has 8 pairs of cameras. The frames captured by all the left cameras are projected onto a cylinder, and then stitched into a panoramic image. A panoramic video can be obtained by repeating the above steps for all the frames captured by the left cameras. Another panoramic video can be obtained by processing the frames captured by the right cameras in the same fashion. These two panoramic videos form a panoramic stereo video.

5. Data Display Unit

As shown in FIG. 1, the data display unit 400 includes a decoding unit 410, and a display headset 420. After going through an encoding and decoding system, the panoramic stereo video is played on display headset 420, which can be a wearable virtual reality (VR) equipment, such as one provided by Oculus VR. The panoramic stereo video is rendered respectively to the left display and the right display of the Oculus device. The display area of the panoramic stereo video can be adjusted in accordance with the movement of the detection device to simulate the change in perspective in the virtual reality.

Figure 5:
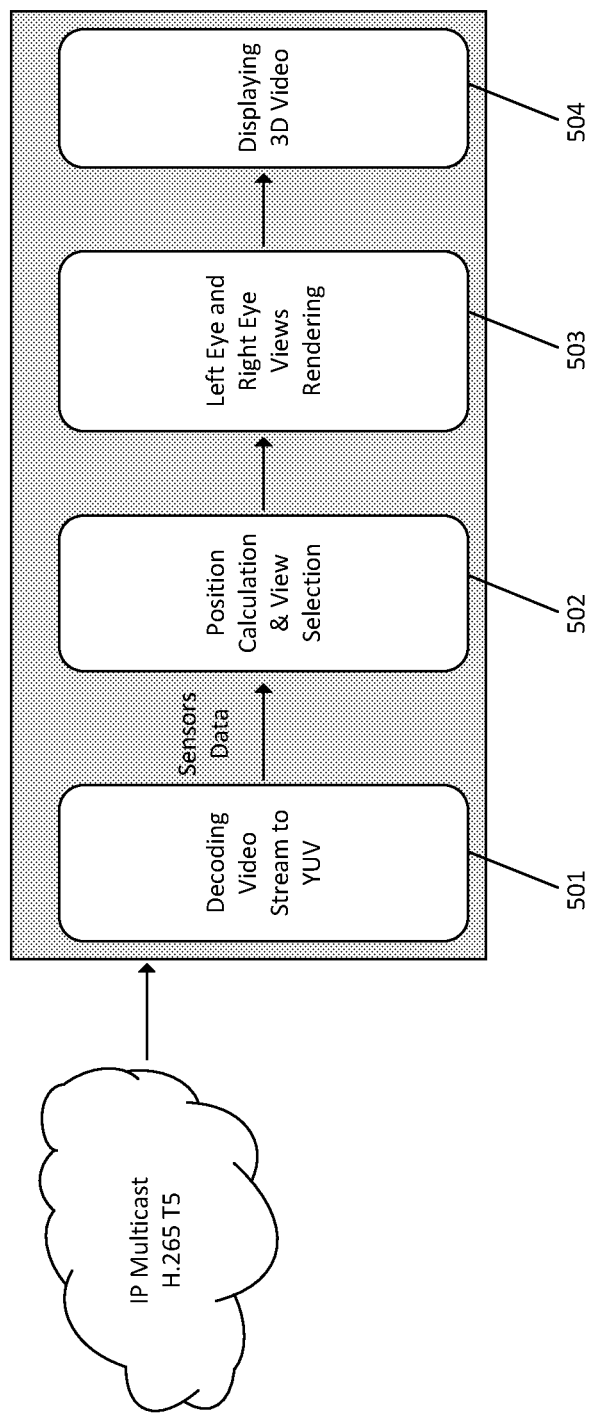
FIG. 5 is an exemplary flowchart for a method of displaying a panoramic stereo video in accordance with an embodiment of the present invention.

FIG. 5 is an exemplary flowchart for a method of displaying a panoramic stereo video in accordance with an embodiment of the present invention. As shown in FIG. 5, in step 501, the encoded video stream is first decoded to YUV. In step 502, position calculation and view selection are made in accordance with the Oculus sensors data. In step 503, the images for the left eye and the right eye are respectively rendered. In step 504, the rendered images are displayed on the Oculus display headset.

6. Stereo Stitching Method

Stereo stitching is different from traditional single panorama stitching. Several specific problems for stereo stitching are listed as follows:

1) each pair of stereo images should be rectified.
2) disparity of different stereo images are different so that disparity preservation should be considered.
3) homography of two overlapping images captured by each left cameras in FIG. 1 is related to homography of their corresponding stereo images captured by each right cameras.

Figure 6:
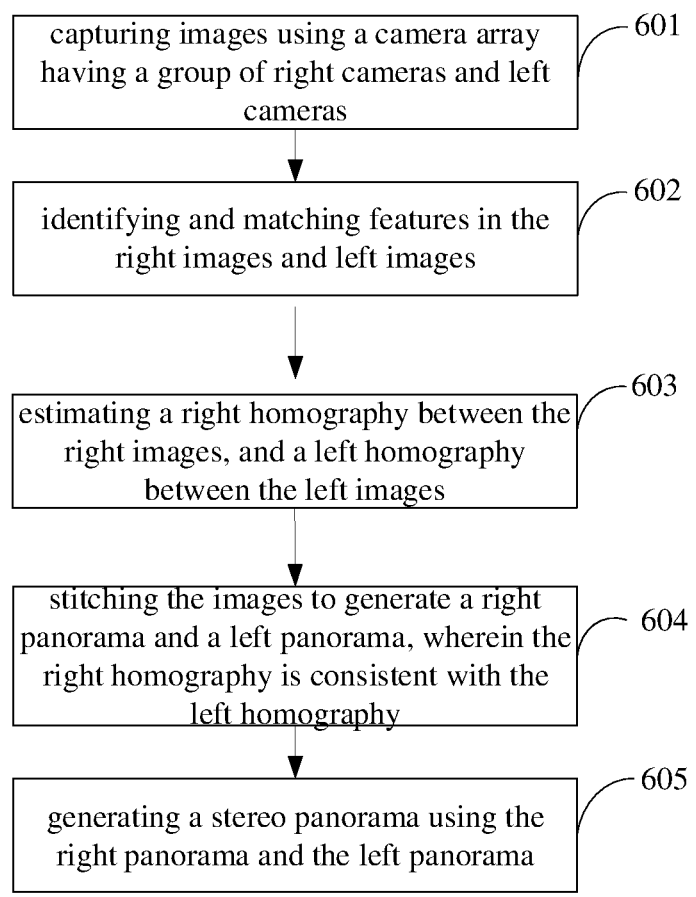
FIG. 6 is an exemplary flowchart for a method of generating a stereoscopic panorama in accordance with an embodiment of the present invention.

FIG. 6 is an exemplary flowchart for a method of generating a stereoscopic panorama in accordance with an embodiment of the present invention. As shown in FIG. 6, the method includes the following steps.

6.1. Image Capturing and Preprocessing

Step 601: capturing a first right image, a second right image, a first left image, and a second left image using a camera array comprising a first right camera, a second right camera, a first left camera, and a second left camera. Here, the camera array may have the configuration in FIG. 2, and have eight pairs of cameras on the sides of a regular octagon. Each pair of cameras have parallel optical axes. Specifically, the relative position among the right cameras is substantially the same as the relative position among the left cameras. As a result, the images captured by the right cameras are related to the images captured by the left cameras in a specific way.

Although the cameras on the camera array are located in a small range, the light condition of different frames can be very different, as some of the cameras are facing opposite directions as other cameras. To enhance robustness in the estimation and calibration of camera parameters, exposure compensation is performed. To speed up processing, resizing of the images is also performed in preprocessing.

6.2. Image Matching

Step 602: identifying and matching a feature in the first right image and the second right image.

Feature detection and matching are the basic steps in the stitching method. In one embodiment, SURF features are used to find matching images. Since only a small number of matching features need to be found in the adjacent images, image matching can be performed efficiently.

6.3. Homography Estimation

Step 603: processing the first right image, the second right image, the first left image, and the second left imaging to derive a right homography between the first right image and the second right image and a left homography between the first left image and the second left image.

As discussed above, stereo stitching faces more constraints than traditional single panorama stitching. A new optimization method is used to provide a solution while satisfying certain constraints.

Suppose $x_l$, $x_r$ are two frames captured by one pair of cameras (one left camera and one right camera as shown in FIG. 2), $y_l$, $y_r$ are two frames captured by the adjacent pair of cameras. Moreover, $x_l$ overlaps with $y_l$, and $x_r$ overlaps with $y_r$. To generate panoramas, it is needed to stitch $x_l$ with $y_l$, and $x_r$ with $y_r$. In one embodiment, the homography $H_l$ between $x_l$ and $y_l$ is kept consistent with the homography $H_r$ between $x_r$ and $y_r$. In a preferred embodiment, $H_l$ and $H_r$ are the same, denoted as H. Equation (1) below shows the re-projection error from $x_l$ to $y_l$, where $\Omega$ indicates the set of matching features between $x_l$ and $y_l$. Similarly, the re-projection error between $x_r$ and $y_r$ is calculated as in equation (2).

$$E_l = \sum_{(\tilde{x}_l,\tilde{y}_l)\in\Omega} \|H\tilde{x}_l - \tilde{y}_l\|^2 \quad (1)$$

$$E_r = \sum_{(\tilde{x}_r,\tilde{y}_r)\in\Omega} \|H\tilde{x}_r - \tilde{y}_r\|^2 \quad (2)$$

In one embodiment, one more constraint is used to ensure the consistence of the homography. Since the purpose of stereo stitching is to generate two stereo panoramas, horizontal disparity should be considered when calculating homography. As indicated by Equation (3) below, to obtain the ideal homography, only horizontal disparity should be encouraged, while vertical disparity resulting from cumulative error and outliers in feature matching should be suppressed, where D is the set including matching feature points between one pair of frames (captured by one left-right pair of cameras), $E_v$ is the orthogonal projection onto the vertical direction (denoted as y axis).

$$E_v = \sum_{(\tilde{x}_l,\tilde{x}_r)\in D} \|H\tilde{x}_l - H\tilde{x}_r\|^2 \quad (3)$$

The overall optimization problem is formalized as formula (4), where an extra parameter $\lambda$ is introduced as a hyper parameter to balance the two parts.

$$\min(E_l+E_r)+\lambda E_v \quad (4)$$

In one embodiment, RANSAC is used to estimate a robust solution of homography between each two pair of overlapping images, which is a basic routine for reducing the influence of outliers thus and enhancing robustness.

6.4 Image Composition

Step 604: stitching the first right image with the second right image to generate a right panorama, the first left image with the second left image to generate a left panorama wherein the right homography is consistent with the left homography. Preferably, the right homography is the same as the left homography.

Once the homography is estimated, two pairs of images can be warped and blended. In one embodiment, conventional warping-seam finding-blending routines are used with good performance. Color based graph cut algorithm for seam finding can be implemented, and multi-band blending is performed to generate the final panoramas.

Step 605: generating a stereo panorama using the right panorama and the left panorama. Finally, two panoramas are warped using cylindrical coordinate, and a stereo panorama is generated.

In accordance with embodiments of the present invention, images are captured using a camera array having certain geometric configuration, and images captured by the camera array are stitched to generate a stereo panoramic video using a method that optimizes performance while satisfying certain constraints.

The various modules, units, and components described above can be implemented as an Application Specific Integrated Circuit (ASIC); an electronic circuit; a combinational logic circuit; a field programmable gate array (FPGA); a processor (shared, dedicated, or group) that executes code; or other suitable hardware components that provide the described functionality. The processor can be a microprocessor provided by from Intel, or a mainframe computer provided by IBM.

Note that one or more of the functions described above can be performed by software or firmware stored in memory and executed by a processor, or stored in program storage and executed by a processor. The software or firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The various embodiments of the present invention are merely preferred embodiments, and are not intended to limit the scope of the present invention, which includes any modification, equivalent, or improvement that does not depart from the spirit and principles of the present invention.

The invention claimed is:

1. An image acquisition and processing apparatus for capturing images to generate a stereoscopic panorama, the image acquisition and processing apparatus comprising:

a camera array comprising a first right camera, a second right camera, a first left camera, and a second left camera, wherein a relative position between the first right camera and the second right camera is substantially the same as a relative position between the first left camera and the second left camera; and an image processing unit configured to stitch a first right image captured by the first right camera with a second right image captured by the second right camera to generate a right panorama, and to stitch a first left image captured by the first left camera with a second left image captured by the second left camera to generate a left panorama, wherein the image processing unit is configured to derive a right homography between the first right image and the second right image consistent with a left homography between the first left image and the second left image, wherein the right homography is the same as the left homography.

2. The image acquisition and processing apparatus of claim 1, wherein the image processing unit is configured to rectify the first right image and the first left image in a first direction.

3. The image acquisition and processing apparatus of claim 2, wherein the image processing unit is configured to warp the first right image and the first left image to a plane parallel to the optical axes of the first right camera and the first left camera.

4. The image acquisition and processing apparatus of claim 2, wherein the image processing unit is configured to suppress disparity in a second direction perpendicular to the first direction.

5. The image acquisition and processing apparatus of claim 1, wherein the image processing unit is configured to identify and match a feature in the first right image and the second right image.

6. The image acquisition and processing apparatus of claim 1, wherein the image processing unit is configured to estimate the right homography using a random sample consensus (RANSAC) algorithm.

7. The image acquisition and processing apparatus of claim 1, wherein the first right camera and the second right camera comprise parallel optical axes.

8. The image acquisition and processing apparatus of claim 1, wherein the first right camera, the second right camera, the first left camera, and the second left camera are situated substantially on a plane.

9. The image acquisition and processing apparatus of claim 8, wherein the first right camera and the second right camera are situated on a first side of a regular polygon, and the first left camera and the second left camera are situated on a second side of the regular polygon adjacent to the first side.

10. A method of generating a stereoscopic panorama, the method comprising:
processing a first right image, a second right image, a first left image, and a second left image to derive a right homography between the first right image and the second right image and a left homography between the first left image and the second left image;

stitching the first right image with the second right image to generate a right panorama, the first left image with the second left image to generate a left panorama wherein the right homography is consistent with the left homography, wherein the right homography is the same as the left homography; and generating a stereo panorama using the right panorama and the left panorama.

11. The method of claim 10, further comprising:
rectifying the first right image and the first left image in a first direction.

12. The method of claim 11, further comprising:
warping the first right image and the first left image to a plane.

13. The method of claim 11, further comprising:
suppressing disparity in a second direction perpendicular to the first direction.

14. The method of claim 11, further comprising:
identifying and matching a feature in the first right image and the second right image.

15. The method of claim 10, further comprising:
estimating the right homography using a random sample consensus (RANSAC) algorithm.

16. The method of claim 10, further comprising:
capturing the first right image, the second right image, the first left image, and the second left image using a camera array comprising a first right camera, a second right camera, a first left camera, and a second left camera, wherein a relative position between the first right camera and the second right camera is substantially the same as a relative position between the first left camera and the second left camera, and the first right camera and the second right camera comprise parallel optical axes.

17. The method of claim 16, wherein the first right camera, the second right camera, the first left camera, and the second left camera are situated substantially on a plane.

18. The method of claim 17, wherein the first right camera and the second right camera are situated on a first side of a regular polygon, and the first left camera and the second left camera are situated on a second side of the regular polygon adjacent to the first side.

* * * * *